(12) United States Patent
Wilson, Jr.

(10) Patent No.: US 11,346,384 B2
(45) Date of Patent: May 31, 2022

(54) THREE-AXIS NINETY-DEGREE TRIANGULAR BRACE

(71) Applicant: Ralph Sloan Wilson, Jr., New Haven, CT (US)

(72) Inventor: Ralph Sloan Wilson, Jr., New Haven, CT (US)

( * ) Notice: Subject to any disclaimer, the term of this patent is extended or adjusted under 35 U.S.C. 154(b) by 0 days.

(21) Appl. No.: 16/873,800

(22) Filed: Jul. 11, 2020

(65) Prior Publication Data
US 2021/0332840 A1 Oct. 28, 2021

Related U.S. Application Data

(60) Provisional application No. 62/921,892, filed on Jul. 12, 2019.

(51) Int. Cl.
*F16B 12/44* (2006.01)

(52) U.S. Cl.
CPC ........ *F16B 12/44* (2013.01); *F16B 2012/446* (2013.01); *Y10T 403/342* (2015.01); *Y10T 403/443* (2015.01)

(58) Field of Classification Search
CPC .......... F16B 7/044; F16B 7/048; F16B 7/185; F16B 12/44; F16B 2012/446; Y10T 403/341; Y10T 403/342; Y10T 403/345; Y10T 403/42; Y10T 403/44; Y10T 403/443; Y10T 403/447; Y10T 403/73
See application file for complete search history.

(56) References Cited

U.S. PATENT DOCUMENTS

| | | | | |
|---|---|---|---|---|
| 1,380,518 A * | 6/1921 | Bellig | ............ | F16B 12/46 403/219 |
| 1,412,163 A * | 4/1922 | Buckingham | ............ | E06B 3/99 403/346 |
| 1,551,714 A * | 9/1925 | Tuschkan | ............ | F16B 12/46 403/219 |
| 2,168,911 A * | 8/1939 | Meyer | ............ | A47F 5/005 403/205 |
| 2,208,227 A * | 7/1940 | Page | ............ | F16B 12/50 52/280 |
| 3,265,419 A * | 8/1966 | Durnbaugh | ............ | H05K 5/04 403/219 |

(Continued)

FOREIGN PATENT DOCUMENTS

| | | | | |
|---|---|---|---|---|
| FR | 2158647 A6 * | 6/1973 | ............ | A47C 19/021 |
| KR | 200464558 Y1 * | 1/2013 | ............ | A47C 19/021 |

*Primary Examiner* — Josh Skroupa
(74) *Attorney, Agent, or Firm* — Chen-Chi Lin

(57) ABSTRACT

An open triangle made of rigid material planes each joined ninety degrees to one another and of sufficient thickness, rigidity, precision and construction for the triangle as a whole to serve as a brace for clamping, aligning, and joining workpieces, especially three workpieces at ninety degrees to one another; the opening of the triangular brace serving as a space for the operation of joining the workpieces, especially joining by means of high-heat welding but also by other means of joining, like drilling and fastening with bolts; the triangular brace being constructed of one piece, or a plurality of pieces in which one plane or all planes of the brace are removable and re-attachable, or rotatable in and out of position, by means of screws, bolts, pins, interlocking tongue-and-groove, magnets, axle for rotation, or other secure means.

11 Claims, 2 Drawing Sheets

(56) References Cited

U.S. PATENT DOCUMENTS

| | | | | |
|---|---|---|---|---|
| 3,315,639 A | * | 4/1967 | Close | B05B 16/40 118/642 |
| 3,353,854 A | * | 11/1967 | Hansen | E04B 1/5818 403/171 |
| 3,399,914 A | * | 9/1968 | Grant | F16B 12/44 52/655.2 |
| 3,586,359 A | * | 6/1971 | Cecelski | F16B 7/00 403/219 |
| 3,703,304 A | * | 11/1972 | Losee | F16B 15/0046 411/462 |
| 3,785,696 A | * | 1/1974 | Moore | B60R 21/11 296/102 |
| 3,912,407 A | * | 10/1975 | Heininger | F16B 7/00 403/205 |
| 4,136,985 A | * | 1/1979 | Taul | B60R 21/131 280/756 |
| 4,347,015 A | * | 8/1982 | Olashaw | F16B 12/50 403/171 |
| 4,505,402 A | * | 3/1985 | Gerhard | B65D 90/0026 220/1.5 |
| 4,536,995 A | * | 8/1985 | Frederick | H04R 1/026 248/220.1 |
| 4,549,711 A | * | 10/1985 | Giltnane | A47C 7/002 248/188 |
| 4,560,301 A | * | 12/1985 | Gilb | B21D 53/38 403/232.1 |
| 4,592,672 A | * | 6/1986 | Ruch, Jr. | F16B 12/50 403/205 |
| 4,900,108 A | * | 2/1990 | Tischer | A47B 47/0008 312/265.3 |
| 5,004,369 A | * | 4/1991 | Young | E04B 1/2612 403/232.1 |
| 5,100,255 A | * | 3/1992 | Rule | B29C 33/307 403/205 |
| 6,068,424 A | * | 5/2000 | Wycech | B62D 25/06 403/269 |
| 6,860,475 B2 | * | 3/2005 | Wong | B25B 5/003 269/41 |
| 7,419,126 B2 | * | 9/2008 | Gibson | F16M 13/025 248/220.1 |

\* cited by examiner

THREE-AXIS NINETY-DEGREE TRIANGULAR BRACE

CROSS-REFERENCE

NA

FEDERALLY SPONSORED

NA

SEQUENCE LISTING

NA

BACKGROUND AND BRIEF DESCRIPTION OF THE INVENTION

Three-axis welding vises (angle clamps) already exist, some with one rotatable or swing-away axial plane. They are complicated, expensive, and include clamps built into the unit and holes for mounting the unit in one place on a workbench. Welders (as people) usually have plenty of clamps in all sizes and shapes, making built-in clamps and bench-mounting of a three-axis clamping unit cumbersome and useless for positioning several such units to hold a structure together for welding all at once. When constructing a rectangular frame such as a table with eight three-axis joints to be welded, it will be more useful to have several simple three-axis braces (eight in such cases) to hold all the work-pieces together in alignment as a whole. Magnetic two-axis angles are quite common but only function for two axes of magnetic materials. The probability of dislodging one or more of twenty-four two-axis magnetic angles required to set up an eight-joint frame is high. The described invention may be classified under CPC B23.

DRAWINGS

In the following illustrations (FIGS. 1 through 4) the dotted lines represent workpieces to be joined in the aperture of the triangular brace. Clamps, such as c-clamps and vise-grips, and/or magnets, securing the workpieces to the triangular brace are not shown.

DETAILED DESCRIPTION OF THE INVENTION

Figure 1:
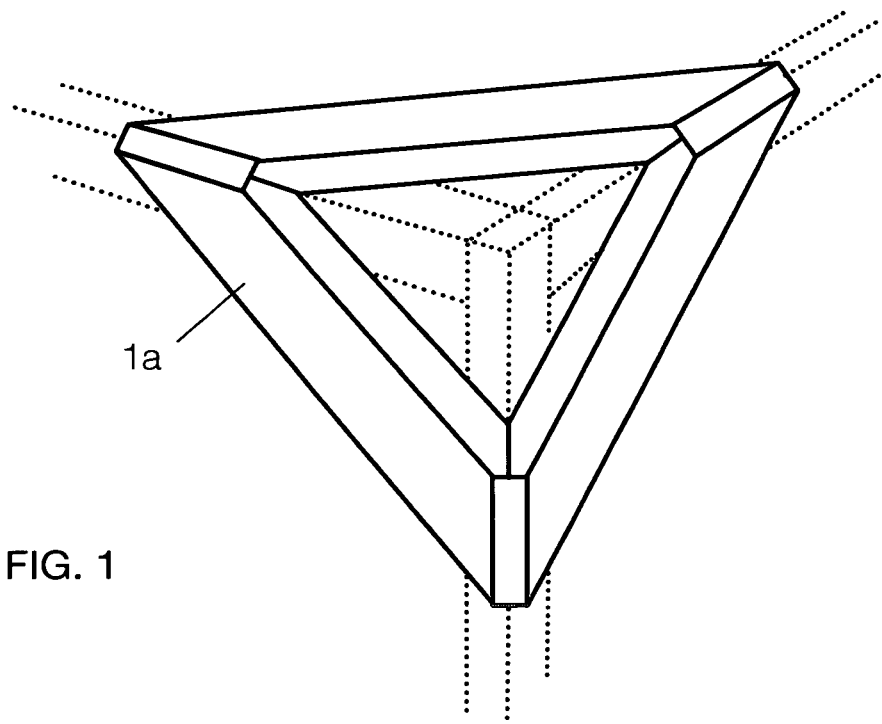
Figure 2:
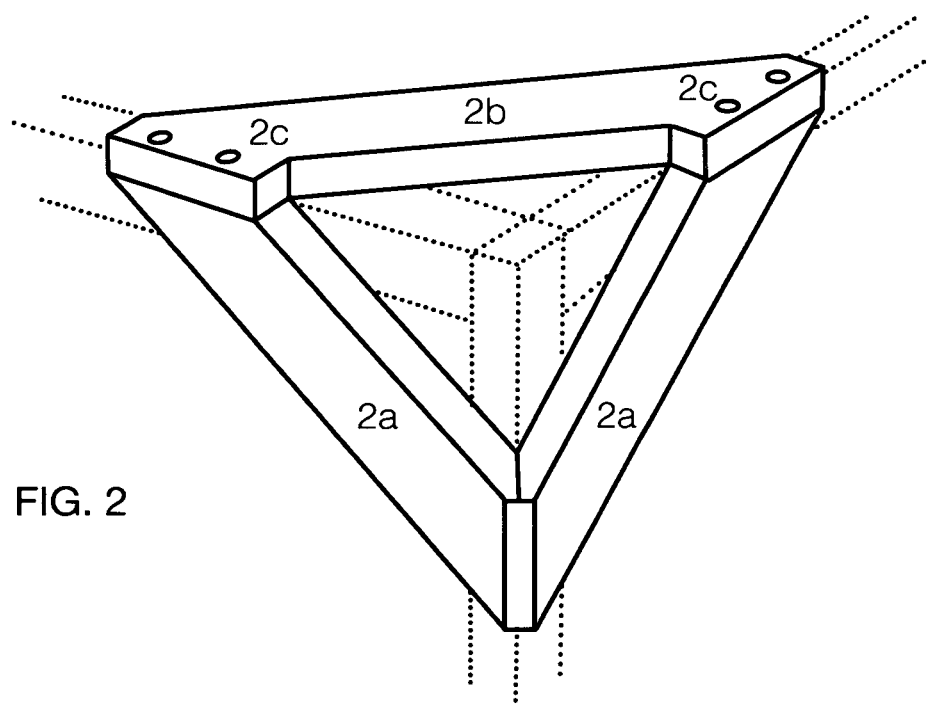
Figure 3:
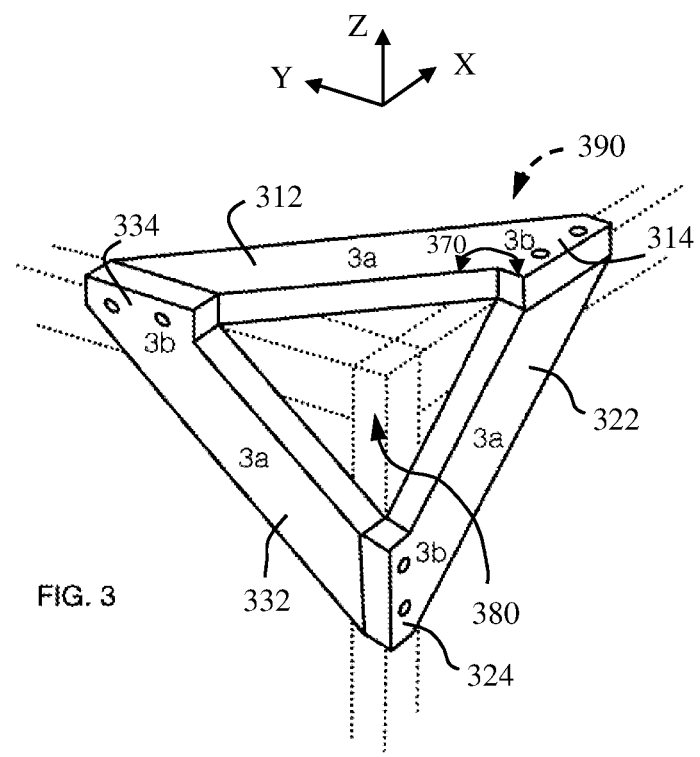
Figure 4:
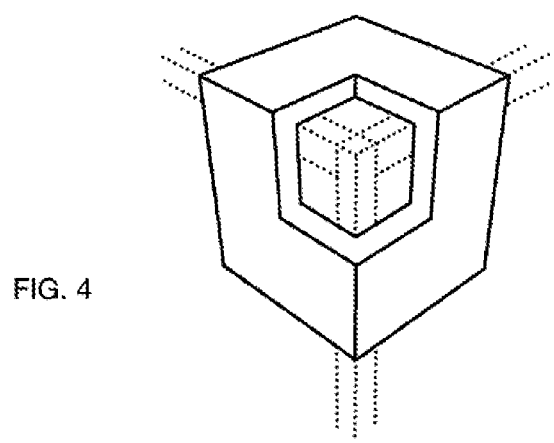

An open triangle made of rigid material planes each joined ninety degrees to one another and of sufficient thickness, rigidity, precision and construction for the triangle as a whole to serve as a brace for clamping, aligning, and joining three pieces of material (workpieces), especially at ninety degrees to one another; the opening (for example, opening 380 of FIG. 3), or aperture, of the triangular brace serving as a space for the operation of joining said workpieces, especially joining by means of high-heat welding but also by other means of joining, like drilling and fastening with bolts; the triangular brace being of one piece (FIG. 1, 1a), or a plurality of parts in which one plane or all planes (FIG. 2, part 2b and FIG. 3, part 3a) of the triangular brace is (or are) removable and re-attachable, or rotatable [for example, in FIG. 3, a top one of part 3a on XY plane rotates about an axle of rotation 3b along an arc direction 390 into position] in and out of position, by means of screws, bolts, pins, interlocking tongue-and-groove, magnets, axle for rotation, or other means (FIG. 2, parts 2c, and FIG. 3 parts 3b). For some cases of high-heat welding the inner faces of the triangular brace may possess ribs or insulators to prevent heat from dissipating to the material of the triangular brace. The planes of the triangular brace need not be straight "bars" and may be arcs, "L" shapes, etc. (FIG. 4), though such forms will not lay as flat for storage, stacking, and portability. For magnetic steel workpieces, an alternative to clamping the triangular brace to the workpieces will be to fix magnets into the triangular brace, one means being to sandwich bar magnets between faces of the triangular brace. In FIG. 2, an open triangle comprises part 2a and part 2b. In FIG. 3, an open triangle comprises a first part 3a on a plane parallel to XY plane, a second part 3a on a plane parallel to XZ plane and a third part 3a on a plane parallel to YZ plane. The first part 3a comprises a longer section 312 and a shorter section 314. The longer section 312 and the shorter section 314 forms a predetermined angle 370. The second part 3a comprises a longer section 322 and a shorter section 324. The third part 3a comprises a longer section 332 and a shorter section 334.

Novelty:

Like data-compression in computer systems, simplicity and resource-savings are important. The real novelties of my invention are its simple design, ease of manufacture, relatively light weight, portability, space-savings (stackable), affordability, and usefulness—ability to utilize a plurality of triangular brace units in several places to hold an entire workpiece together in alignment for joining.

The invention claimed is:

1. A brace comprising
    a first part;
    a second part; and
    a third part;
    wherein the brace is characterized by
        an assembled condition in which
            the first part is perpendicularly connected to the second part;
            the second part is perpendicularly connected to the third part;
            the third part is perpendicularly connected to the first part; and
            the first part, the second part, and the third part form an opening configured to join a plurality of workpieces; and
        a rotatable condition in which
            the first part is rotatable about a first axle for rotation;
            the second part is rotatable about a second axle for rotation perpendicular to the first axle for rotation; and
            the third part is rotatable about a third axle for rotation perpendicular to the first axle for rotation and the second axle for rotation.

2. The brace of claim 1, wherein each of a surface of the first part, a surface of the second part, and a surface of the third part comprises an insulator material.

3. The brace of claim 1, wherein each of the first part, the second part, and the third part is of a straight bar shape.

4. The brace of claim 1, wherein each of the first part, the second part, and the third part is of a letter L shape.

5. A brace comprising
    a first part positioned on a first plane, the first part comprising
        a first section; and
        a second section connected to the first section of the first part, a predetermined angle being formed between the first section of the first part and the second section of the first part;

a second part positioned on a second plane perpendicular to the first plane, the second part comprising
a first section; and
a second section connected to the first section of the second part, the predetermined angle being formed between the first section of the second part and the second section of the second part; and
a third part positioned on a third plane perpendicular to the first plane and the second plane, the third part comprising
a first section; and
a second section connected to the first section of the third part, the predetermined angle being formed between the first section of the third part and the second section of the third part;
wherein the second section of the first part is directly connected to the first section of the second part;
wherein the second section of the second part is directly connected to the first section of the third part;
wherein the second section of the third part is directly connected to the first section of the first part;
wherein an outer peripheral of a surface of the first section of the first part is of a quadrilateral shape;
wherein the surface of the first section of the first part is parallel with the first plane;
wherein an outer peripheral of a surface of the second section of the first part is of another quadrilateral shape; and
wherein the surface of the second section of the first part is parallel with the first plane.

6. The brace of claim 5, wherein the first section of the first part is longer than the second section of the first part; wherein the first section of the second part is longer than the second section of the second part; and wherein the first section of the third part is longer than the second section of the third part.

7. The brace of claim 5, wherein the first part, the second part, and the third part are of a same size.

8. The brace of claim 5, wherein the predetermined angle is ninety degrees.

9. The brace of claim 8, wherein a length of the first section of the first part is the same as a length of the second section of the first part; wherein a length of the first section of the second part is the same as a length of the second section of the second part; and wherein a length of the first section of the third part is the same as a length of the second section of the third part.

10. The brace of claim 9, wherein the first part, the second part, and the third part are of a single piece construction.

11. A brace comprising
a first part positioned on a first plane, the first part comprising
a first section;
a second section connected to the first section, a first predetermined angle being formed between the first section and the second section; and
a third section connected to the second section, a second predetermined angle being formed between the second section and the third section; and
a second part being a single piece construction, the second part comprising
a first member; and
a second member connected to the first member of the second part;
wherein the brace is characterized by
an assembled condition in which
the first member of the second part is positioned on a second plane perpendicular to the first plane;
the second member of the second part is positioned on a third plane perpendicular to the first plane and the second plane;
the first member of the second part is connected to the first section of the first part; and
the second member of the second part is connected to the third section of the first part; and
a rotatable condition in which
the first part is rotatable about a first axle for rotation.

* * * * *